(12) United States Patent
Shechtman et al.

(10) Patent No.: US 8,625,927 B2
(45) Date of Patent: Jan. 7, 2014

(54) IMAGE PROCESSING USING IMAGE WEB

(75) Inventors: Elya Shechtman, Seattle, WA (US);
Dan Goldman, Seattle, WA (US); Adam Finkelstein, Princeton, NJ (US);
Connelly Barnes, Corvallis, OR (US);
Jacob Lewellen, Bellevue, WA (US)

(73) Assignee: Adobe Systems Incorporated, San Jose, CA (US)

( * ) Notice: Subject to any disclaimer, the term of this patent is extended or adjusted under 35 U.S.C. 154(b) by 132 days.

(21) Appl. No.: 13/283,230

(22) Filed: Oct. 27, 2011

(65) Prior Publication Data

US 2013/0163884 A1    Jun. 27, 2013

Related U.S. Application Data

(60) Provisional application No. 61/408,326, filed on Oct. 29, 2010, provisional application No. 61/407,306, filed on Oct. 27, 2010.

(51) Int. Cl.
*G06K 9/64* (2006.01)
(52) U.S. Cl.
USPC ............................................................. 382/278
(58) Field of Classification Search
None
See application file for complete search history.

(56) References Cited

U.S. PATENT DOCUMENTS

| | | | |
|---|---|---|---|
| 6,018,592 A | 1/2000 | Shinagawa et al. | |
| 6,263,088 B1 | 7/2001 | Crabtree et al. | |
| 6,347,152 B1 | 2/2002 | Shinagawa et al. | |
| 6,987,520 B2 | 1/2006 | Criminisi et al. | |
| 7,088,870 B2 | 8/2006 | Perez et al. | |
| 7,336,851 B1 | 2/2008 | Cote | |
| 7,760,912 B2 | 7/2010 | Dana et al. | |
| 7,773,099 B2 | 8/2010 | Forlines et al. | |
| 7,826,683 B2 | 11/2010 | Phillips | |
| 8,139,850 B2 | 3/2012 | Maxwell et al. | |
| 8,139,867 B2 | 3/2012 | Maxwell et al. | |
| 8,285,055 B1 * | 10/2012 | Barnes et al. | 382/195 |
| 2003/0099406 A1 | 5/2003 | Georgiev et al. | |
| 2004/0164996 A1 | 8/2004 | Criminisi et al. | |
| 2005/0053131 A1 * | 3/2005 | Domke et al. | 375/240.01 |
| 2005/0128210 A1 | 6/2005 | Berger | |
| 2005/0128211 A1 | 6/2005 | Berger et al. | |
| 2005/0220348 A1 | 10/2005 | Chiu et al. | |
| 2006/0120624 A1 | 6/2006 | Jojic et al. | |
| 2006/0284874 A1 | 12/2006 | Wilson | |
| 2006/0285762 A1 | 12/2006 | Sun et al. | |

(Continued)

OTHER PUBLICATIONS

Connelly Barnes, Eli Shechtman, Adam Finkelstein, and Dan B Goldman. 2009. PatchMatch: a randomized correspondence algorithm for structural image editing. ACM Trans. Graph. 28, 3, Article 24 (Jul. 2009).*

(Continued)

*Primary Examiner* — Nirav G Patel
(74) *Attorney, Agent, or Firm* — Wolfe-SBMC (57) ABSTRACT

A computer-implemented method for determining correspondence between images includes: receiving images in a computer system; performing iterations using the computer system to find respective mappings for each patch of pixels in the images to a patch in another one of the images such that the mappings have minimal patch distance, the iterations including at least: (i) evaluation of a nearby-pixel mapping in a current image, (ii) evaluation of a randomly selected mapping in the current image, and (iii) evaluation of a randomly selected mapping in another one of the images; and generating a mapping record that results from the iterations.

21 Claims, 5 Drawing Sheets

(56) References Cited

U.S. PATENT DOCUMENTS

| | | |
|---|---|---|
| 2007/0025637 A1 | 2/2007 | Setlur et al. |
| 2008/0112642 A1 | 5/2008 | Matsushita et al. |
| 2008/0238942 A1 | 10/2008 | Sun et al. |
| 2008/0238945 A1 | 10/2008 | Wakizaka |
| 2008/0292162 A1 | 11/2008 | Gering et al. |
| 2009/0141992 A1 | 6/2009 | Coulombe et al. |
| 2009/0180713 A1 | 7/2009 | Bucha et al. |
| 2010/0183242 A1 | 7/2010 | Brand |
| 2010/0287511 A1 | 11/2010 | Meier et al. |
| 2010/0289817 A1 | 11/2010 | Meier et al. |
| 2010/0328352 A1 | 12/2010 | Shamir et al. |
| 2011/0182502 A1 | 7/2011 | Liang |

OTHER PUBLICATIONS

Kokaram, Anil C., J. A. Stark, and William J. Fitzgerald. "Enhancement and restoration of ancient manuscripts." Society of Photo-Optical Instrumentation Engineers (SPIE) Conference Series. vol. 1771. 1993.*

'Web-Archive' [online] "Creative Commons," 2010, [retrieved on Jan. 26, 2012]. Retrieved from Internet: <URL: http://web.archive.org/web/20100130095204/http:/creativecommons.org/> . 3 pages.

'Wikipedia' [online] "Java (programming language)," 2002, [retrieved on Jan. 27, 2012]. Retrieved from the Internet: <URL: http://en.wikipedia.org/w/index.php?title=Java_(programming_language)&oldid-550214>. 7 pages.

'Wikipedia' [online]. "OpenGL," Dec. 2004, [retrieved on Jan. 27, 2012]. Retrieved from the Internet: <URL:http://en.wikipedia.org/w/index.php?title=OpenGL&oldid=9281664>, 3 pages.

"AutoCollage" [online]. Microsoft Research 2008, [retrieved on Nov. 26, 2008]. Retrieved from he Internet: <URL: http://research.microsoft.com/autocollage/>.

Agarwala, A., Dontcheva, M., Agrawala, M., Drucker, S., Colburn, A., Curless, B., Salesin, D., and Cohen, M., "Interactive digital photomontage", *ACM Trans. Graph.* 23, 3, pp. 294-302, dated 2004.

Arya, S., Mount, D., Netanyahu, N., Silverman, R., and Wu, A., "An optimal algorithm for approximate nearest neighbor searching in fixed dimensions", in *Proc. Fifth Symp. Discrete Algorithms (SODA)*, pp. 573-582, dated 1994.

Ashikhmin, M., "Synthesizing natural textures", in *I3D '01 Proceedings of the 2001 symposium on Interactive 3D graphics*, ACM, New York, NY, USA, pp. 217-226, dated 2001.

Avidan, S., and Shamir, A., "Seam carving for content-aware image resizing", in *ACM Trans. Graph.* 26, 3, 10, dated 2007.

Barnes, Connelly, Shechtman, Eli, Finkelstein, Adam and Goldman, Dan B., "A Randomized Algorithm for Nearest Neighbor Fields", dated Sep. 8, 2008, p. 1-5.

Barnes, et al., "Supplementary Material for the Generalized PatchMatch Correspondence Algorithm", Downloaded from the internet at http://www.cs.princeton.edu/gfx/pubs/Barnes_2010_TGP/index.php Correspondence on Sep. 9, 2010, 6 pages.

Barnes, et al., "The Generalized PatchMatch Correspondence Algorithm", Downloaded from the internet at http://www.cs.princeton.edu/gfx/pubs/Barnes_2010_TGP/index.php on Sep. 9, 2010, 14 pages.

Bertalmio, M., Sapiro,G., Caselles, V., and Ballester, C., "Image inpainting", in *SIGGRAPH '00: Proceedings of the 27th annual conference on computer graphics and interactive techniques*, ACM Press/Addison-Wesley Publishing Co., New York, NY, USA, pp. 417-424, dated 2000.

Boiman et al. "In Defense of Nearest-Neighbor Based Image Classification." Academic Paper, The Weizmann Institute of Science, Jun. 2008, 8 pages.

Bourdev and Brandt, "Robust Object Detection Via Soft Cascade" in *Proceedings from CVPR 2005, IEEE Computer Society*, pp. 2236-2243.

Boykov, Y., Veksler, O., and Zabih, R., "Fast approximate energy minimization via graph cuts", in *Pattern Analysis and Machine Intelligence, IEEE Transactions on* 23, 11 (Nov.), pp. 1222-1239, dated 2001.

Buades, A., Coll, B., and Morel, J.M. 2005. A non-local algorithm for image denoising. In *Computer Vision and Pattern Recognition, 2005. CVPR 2005. IEEE Computer Society Conference on*, vol. 2, 60-65 vol. 2.

Chen et al. "Sketch2Photo: Internet Image Montage." ACM Transactions on Graphics (TOG)—Proceedings of ACM SIGGRAPH Asia 2009, Dec. 2009, 10 pages.

Cho, T. S., Butman, M., Avidan, S., and Freeman, W., "The patch transform and its applications to image editing", in *Computer Vision and Pattern Recognition, 2008. CVPR 2008. IEEE Conference on (June)*, pp. 1-8, dated 2008.

Criminisi, A., Perez, P., and Toyama, K. 2003. Object removal by exemplar-based inpainting. *Computer Vision and Pattern Recognition IEEE, Computer Society Conference on* 2, 721.

Criminisi, A., Perez, P., and Toyama, K., "Region filling and object removal by exemplar-based image inpainting", in *IEEE Trans. Image Processing 13*, 9 (September),p. 1200-1212, dated 2004.

Dale et al. "Image Restoration using Online Photo Collections." Proc. IEEE Conference on Computer Vision, Sep. 2009, 8 pages.

Datar, Immorlica, Indyk, and Mirrokni, "Locality-sensitive hashing scheme based on p-stable distributions", in *COMPGEOM: Annual ACM Symposium on Computational Geometry*, dated 2004.

Drori, I., Cohen-or, D., and Yeshurun, H., 2003. Fragment-based image completion. *ACM Transactions on Graphics* 22, 303-312.

Efros, A. A., and Freeman, W.T., "Image quilting for texture synthesis and transfer", in *SIGGRAPH 2001, Computer Graphics Proceedings*, ACM Press/ACM SIGGRAPH, E. Fiume, Ed., pp. 341-346, dated 2001.

Efros, A. A., and Leung, T. K., "Texture synthesis by non-parametric sampling", in *Computer Vision, IEEE International Conference on* 2, p. 1033, dated 1999.

Eisemann et al. "Photo Zoom: High Resolution from Unordered Image Collections." SIGGRAPH 2010, Los Angeles, California, May 2010, 1 page.

Fischler, M.A., and Bolles, R.C., 1981. Random sample consensus: a paradigm for model fitting with applications to image analysis and automated cartography. *Commun. ACM* 24, 6, 381-395.

Fitzgibbon, A., Wexler, Y., and Zisserman, A., 2003. Image-based rendering using image-based priors. In ICCV '03: *Proceedings of the Ninth IEEE International Conference on Computer Vision*, IEEE Computer Society, Washington, DC, USA 1176.

Freeman, W. T., Pasztor, E. C., and Y, O. T. C., "Learning low-level vision", in *International Journal of Computer Vision 40*, dated 2000.

Freeman, W., Jones, T., and Pasztor, E. 2002. Example-based super-resolution. *Computer Graphics and Applications, IEEE* 22, 2(Mar./Apr.) 56-65.

HaCohen et al. "Image Upsampling via Texture Hallucination." IEEE International Conference on Computational Photography, Mar. 2010, 8 pages.

Han et al. "Multiscale Texture Synthesis." *ACM Transactions on Graphics*, vol. 27, No. 3, Aug. 2008, 8 pages.

Hays and Efros. "Scene Completion Using Millions of Photographs." SIGGRAPH 2007, San Diego, California, Aug. 2007, 7 pages.

Hertzmann, A., Jacobs, C. E., Oliver, N., Curless, B., and Salesin, D., "Image analogies", in *SIGGRAPH*, pp. 327-340, dated 2001.

Johnson et al. "CG2Real: Improving the Realism of Computer Generated Images Using a Large Collection of Photographs." *IEEE Transactions on Visualization and Computer Graphics*, vol. 17, No. 6, Sep. 2011, 13 pages.

Kaneva et al. "Infinite Images: Creating and Exploring a Large Photorealistic Virtual Space." *Proceeding of the IEEE*, vol. 98, No. 8, Aug. 2010, 17 pages.

Kirkpatrick et al. "Optimization by Simulated Annealing." *Science*, vol. 220, No. 4598, May 1983, 10 pages.

Komodakis, N., and Tziritas, G. 2007, Image completion using efficient belief propagation via priority scheduling and dynamic pruning. *IEEE Transactions on Image Processing* 16, 11, 2649-2661.

Kopf, J., Fu, C.-W., Cohen-Or, D., Deussen, O., Lischinski, D., and Wong, T.-T. 2007. Solid texture synthesis from 2d exemplars. *ACM Transactions on Graphics (Proceedings of SIGGRAPH 2007)* 26, 3, 2:1-2:9.

(56) References Cited

OTHER PUBLICATIONS

Kumar, N., Zhang, L., and Nayar, S.K., "What is a good nearest neighbors algorithm for finding similar patches in images?", in *European Conference on Computer Vision, II*: pp. 364-378, dated 2008.

Kwatra V., Schdl, A., Essa, I., Turk, G., and Bobick, A., "Graphcut textures: Image and video synthesis using graph cuts", in *ACM Transactions on Graphics, SIGGRAPH 2003* 22, 3 (July), pp. 277-286, dated 2003.

Kwatra, V., Essa, I., Bobick, A., Kwatra N., "Texture optimization for example-based synthesis", in *ACM Trans. Graph.*, 24(3): pp. 795-802, dated 2005.

Lefebvre, S., and Hoppe, H., "Parallel controllable texture synthesis", in *ACM Trans. Graph* 24, 3, pp. 777-786, dated 2005.

Liang, L., Liu, C., Xu, Y.-Q., Guo, B., and Shum, H.-Y., "Real-time texture synthesis by patch-based sampling" in *ACM Trans. Graph.* 20, 3, pp. 127-150, dated 2001.

Lin, et al. "Random Forests and Adaptive Nearest Neighbors", Technical Report No. 1055, Downloaded from the internet on Sep. 7, 2010 at www.stat.wise.edu/Department/techreports/tr1081.pdf; May 29, 2002, 31 pages.

Liu et al. "Face Hallucination: Theory and Practice." *International Journal of Computer Vision (IJCV)*, vol. 75, No. 1, Oct. 2007, 33 pages.

Liu, F., and Gleicher, M., "Automatic image retargeting with fisheye-view warping", in *UIST, ACM, P. Baudisch, M. Czerwinski and D.R. Olsen, Eds.*, pp. 153-162, dated 2005.

Liu, X., Mei, T., Hua, X.-S., Yang, B., and Zhou, H.-Q., "Video Collage", in *MM'07*, pp. 461-462, dated 2007.

Lowe, D.G. "Object Recognition from Local Scale-Invariant Features." Computer Vision, 1999. The Proceedings of the Seventh IEEE International Conference, Kerkyra, Greece, Sep. 1999, 8 pages.

Mikolajczyk, K., and Matas, J. G., "Improving descriptors for fast tree matching by optimal linear projection", in *International Conference on Computer Vision*, pp. 1-8, dated 2007.

Miranda et al. "New Routes from Minimal Approximation Error to Principal Components." *Neural Processing Letters*, vol. 27, No. 3, Jun. 2008, 14 pages. .

Mount, D.M. and Arya, S. "ANN: A library for approximate nearest neighbor searching", dated Oct. 28, 1997.

Pandey et al. "Nearest-Neighbor Caching for Content-Match Applications." International World Wide Web Conference Committee (IW3C2), Madrid, Spain, Apr. 2009, 10 pages.

Pavic, D., Schonefeld, V., and Kobbelt, L. 2006. Interactive image completion with perspective correction. *The Visual Computer* 22 (Sep.), 671-681(11).

Peterson, J. L. "Computer Programs for Detecting and Correcting Spelling Errors." *Computing Practices: Communications of the ACM*, vol. 23, No. 12, Dec. 1980, 12 pages.

Rong, G., and Tan, T.-S., "Jump flooding in gpu with applications to voronoi diagram and distance transform", in *I3D '06: Proceedings of the 2006 symposium on Interactive 3D graphics and games*, ACM, New York, NY, USA, pp. 109-116, dated 2006.

Rother, C., Bordeaux, L., Hamadi, Y., and Blake, A., "Autocollage", in *ACM Trans. Graph* 25, 3, pp. 847-852, dated 2006.

Rother, C., Kumar, S., Kolmogorov, V., and Blake, A., "Digital tapestry", in *IEEE Computer Vision and Pattern Recognition or CVPR, I*, pp. 589-596, dated 2005.

Rubinstein, M., Shamir, A., and Avidan, S., "Improved seam carving for video retargeting", in *ACM Transactions on Graphics (SIGGRAPH)* 27, 3, dated 2008.

Setlur, V., Takagi, S., Raskar, R., Gleicher, M., and Gooch, B., "Automatic image retargeting", in *MUM, ACM, M. Billinghurst, Ed., vol. 154 of ACM International Conference Proceeding Series*, pp. 59-68, dated 2005.

Shiratori, T., Matsushita, Y., Tang, X., and Kang, S. B., "Video completion by motion field transfer", in *Computer Vision and Pattern Recognition, 2006 IEEE Computer Society Conference on 1 (Jun.)*, pp. 411-418, dated Jun. 2006.

Simakov, D., Caspi, Y., Shechtman E., and Irani, M., "Summarizing visual data using bidirectional similarity", in *Proc. IEEE Conference on Computer Vision and Pattern Recognition (CVPR)*, pp. 1-8, dated 2008.

Snavely et al. "Photo Tourism: Exploring Photo Collections in 3D." *ACM Transactions on Graphics (SIGGRAPH Proceedings)*, vol. 25, No. 3, Jul. 2006, 12 pages.

Sun, J., Yuan, L., Jia, J., and Shum, H.-Y. 2005. Image completion with structure propagation. In *SIGGRAPH '05:ACM SIGGRAPH 2005 Papers*, ACM, New York, NY, USA 861-868.

Tong, X., Zhang, J., Liu, L., Wang, X., Guo, B., and Shum, H.-Y., "Synthesis of bidirectional texture functions on arbitrary surfaces", in *ACM Transactions on Graphics 21*, 3 (Jul.), pp. 665-672, dated Jul. 2002.

Tourapis, A. M., "Enhanced predictive zonal search for single and multiple frame motion estimation", in *VCIP, SPIE, C. C. J. Kuo, Ed., vol. 4671 of Proceedings of SPIE*, pp. 1069-1079, dated 2002.

Wang et al. "Factoring Repeated Content Within and Among Images." *ACM Trans. on Graphics (SIGGRAPH)*, vol. 27, No. 3, Aug. 2008, 10 pages.

Wang, T., Mei, T., Hua, X.—S., Liu, X., and Zhou, H.-Q., "Video collage: A novel presentation of video sequence", in *ICME, IEEE*, pp. 1479-1482, dated 2007.

Wang, Y.-S., Tai, C.-L., Sorkine, O., and Lee, T.-Y. 2008. Optimized scale-and-stretch for image resizing. In *siggraph asia '08: ACM SIGGRAPH Asia 2008 papers*, ACM, New York, NY, USA, 1-8.

Webb, A. R. "Chapter 6. Nonlinear Discriminant Analysis—Projection Methods." *Statistical Pattern Recognition*, Jul. 2009, 22 pages.

Wei, L. Y., and Levoy, M., "Fast texture synthesis using tree-structured vector quantization", in *SIGGraph-00*, pp. 479-488, dated 2000.

Wei, L.-Y., Han, J., Zhou, K., Bao, H., Guo, B., and Shum, H.-Y., "Inverse texture synthesis", in *ACM Trans. Graph 27*, 3, pp. 1-9, dated 2008.

Wexler, Y., Shechtman, E., and Irani, M., "Space-time completion of video", in *IEEE Trans. Pattern Analysis and Machine Intelligence 29*, 3, (Mar.), pp. 463-476, dated Mar. 2007.

Wexler, Y., Shechtman, E., and Irani, M., "Space-time video completion", in *Computer Vision and Pattern Recognition, IEEE Computer Society Conference on 1*, pp. 120-127, dated 2004.

Wolf, L., Guttmann, M., and Cohen-Or, D., 2007. Non-homogeneous content-driven video-retargeting. In *Proceedings of the Eleventh IEEE International Conference on Computer Vision (ICCV-07)*.

Yianilos, P.N., "Data structures and algorithms for nearest neighbor search in general metric spaces", in *SODA*, pp. 311-321, dated 1993.

Baker, S. and Kanade, T. "Limits on Super-Resolution and How to Break Them." *IEEE Transactions on Pattern Analysis and Machine Intelligence*, vol. 24, No. 9, Sep. 2002, 36 pages.

Bay et al. "SURF; Speeded Up Robust Features." *Computer Vision and Image Understanding (CVIU)*, vol. 110, No. 3, 2008, 14 pages.

Chang et al. "Super-Resolution Through Neighbor Embedding." *Computer Vision and Pattern Recognition, 2004, CVPR 2004, Proceedings of the 2004 IEEE Computer Society Conference*, Jul. 2004, 8 pages.

'phpFlickr' [online] "phpFlickr version 3.1," Jan. 2011, [retrieved on Jan. 26, 2012]. Retrieved from the Internet: <URL: http://phpflickr.com/>. 4 pages.

\* cited by examiner

IMAGE PROCESSING USING IMAGE WEB

CROSS-REFERENCE TO RELATED APPLICATIONS

This application claims priority from Provisional Application Ser. No. 61/408,326 filed Oct. 29, 2010, and entitled "PatchWeb: An Extension of PatchMatch," and from Provisional Application Ser. No. 61/407,306 filed Oct. 27, 2010, and entitled "PatchWeb: An Extension of PatchMatch," the contents of both of which are incorporated herein by reference.

BACKGROUND

This specification relates to image processing using an image web.

Image likeness, such as a correspondence between regions of one or more images, can be defined in many different implementations that depend on such correspondences. For example, this can include algorithms for correspondence in computer vision, such as wide baseline stereo matching and motion tracking, and graphics algorithms for image summarization, image completion, synthesizing textures, images and video, and others.

For example, a similarity score between images can be computed by a bidirectional similarity metric, which measures the distance from each patch in one image to the other image, and vice versa. A bidirectional similarity can be evaluated based on a patch distance metric. A bidirectional similarity computation can involve calculating nearest neighbor patches, which can be computationally demanding. Even with available approximation techniques, the bidirectional similarity calculation may not be quick enough for use in interactive applications for very large images. Moreover, approximation techniques may not be useable with certain distance metrics.

SUMMARY

The invention relates to image processing using an image web.

In a first aspect, a computer-implemented method for determining correspondence between images includes: receiving images in a computer system; performing iterations using the computer system to find respective mappings for each patch of pixels in the images to a patch in another one of the images such that the mappings have minimal patch distance, the iterations including at least: (i) evaluation of a nearby-pixel mapping in a current image, (ii) evaluation of a randomly selected mapping in the current image, and (iii) evaluation of a randomly selected mapping in another one of the images; and generating a mapping record that results from the iterations.

In a second aspect, a computer program product is tangibly embodied in a non-transitory storage device and includes instructions that when executed by a processor perform a method comprising: receiving images in a computer system; performing iterations using the computer system to find respective mappings for each patch of pixels in the images to a patch in another one of the images such that the mappings have minimal patch distance, the iterations including at least: (i) evaluation of a nearby-pixel mapping in a current target image, and (ii) evaluation of a randomly selected mapping in another one of the images; and generating a mapping record that results from the iterations.

In a third aspect, a system includes: a repository of images; and an image processing component that performs iterations to find respective mappings for each patch of pixels in the images to a patch in another one of the images such that the mappings have minimal patch distance, the iterations including at least: (i) evaluation of a nearby-pixel mapping in a current image, (ii) evaluation of a randomly selected mapping in the current image, and (iii) evaluation of a randomly selected mapping in another one of the images. The image processing component generates a mapping record based on the iterations.

Implementations can include any or all of the following features. A first patch is currently mapped to a second patch, and the second patch is currently mapped to a third patch, the method further comprising determining whether the third patch has a smaller patch distance to the first patch than what the second patch has, and if so mapping the first patch to the third patch instead. A first patch is currently mapped to a second patch, and the second patch is currently mapped to a third patch, the method further comprising determining whether the first patch has a smaller patch distance to the second patch than what the third patch has, and if so mapping the second patch to the first patch instead.

The method further comprises assigning groups of the images to each of multiple working sets, and providing each of multiple processes with at least one of the working sets, wherein each process uses the group of images in the respective working set. Assigning the group of images for at least one of the working sets comprises: finding a first subset of the group by choosing random locations in a first image and selecting the images to which the respective random locations are mapped; finding a second subset of the group by choosing random locations in the first image and selecting the images that are mapped to by locations to which the random locations are mapped; and finding a third subset of the group by choosing images at random. The method further comprises ejecting at least some of the images from the working set and replacing them with a new group from the received images, each image in the new group selected based on which of the first, second and third subsets included a corresponding ejected image.

The mapping record has a specific sparsity with less than one mapping per pixel.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
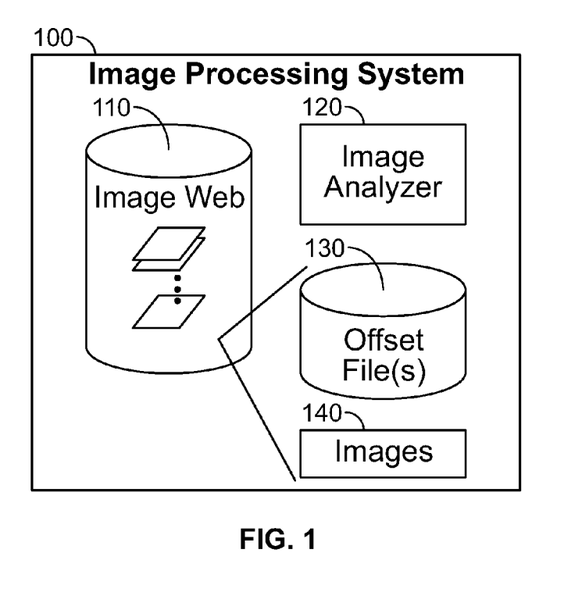
FIG. 1 is an example block diagram of an image processing system.

FIG. 1 is an example block diagram of an image processing system 100. The system 100 includes at least one image web 110 and an image analyzer 120. The image web 110 comprises one or more offset files 130 and images 140. The offset file 130 defines nearest neighbor relationships between patches in the images 140. In some implementations, the offset file(s) 130 and images 140 are not separate files but rather are jointly stored as respective characteristics for each pixel. The image web 130 can be used in many vision and graphics implementations, such as by the image analyzer 120. The image web 130 can be used for image completion, image enlargement or compression, object recognition, image analysis, image generation, image retargeting, morphing, image enhancement or image denoising, to name a few examples.

Figure 2:
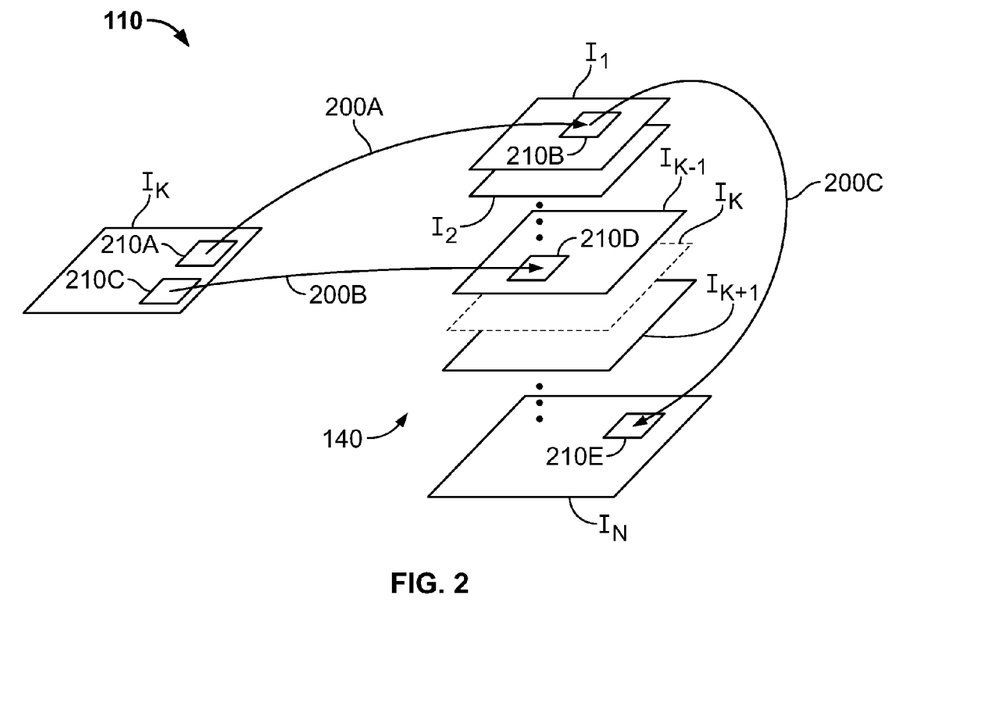
FIG. 2 shows an example of mapping between image regions in the image web of FIG. 1.

FIG. 2 shows an example of mapping between image regions in the image web of FIG. 1. In this example, it is assumed that there are N number of images in the image web 110. That is, the N images are here the same as the images 140, and are numbered $I_1$ through $I_N$. Accordingly, an arbitrary image can be denoted by $I_i$, where i=1 ... N.

The images 140 are here schematically illustrated as planes for clarity, but the images can have any suitable image format. The images 140 can be stored in a pixel-based format, and each of the images can include the same or a different number of pixels as any other one of the images. The images can use any suitable color model (e.g., the RGB color model) and can be stored in any suitable format (e.g., bitmap (BMP) format). Implementations can involve processing of data organized in two or three dimensions, and/or a video image, to name a few examples.

For every image $I_k$ in the image web 110, the offset file 130 (FIG. 1) defines a number of mappings 200 to one or more other images, or to the same image. Particularly, a mapping specifies, for each patch 210 in one of the images, at least one nearest neighbor patch in one or more of the images. Here, for example, the patch 210A in the image $I_k$ has the mapping 200A to a patch 210B in the image $I_1$. Similarly, the patch 210C in the image $I_k$ has the mapping 200B to a patch 210D in the image $I_{k-1}$. The patch 210B in the image $I_k$, moreover, has the mapping 200C to a patch 210E in the image $I_N$.

A patch is a region in an image, of fixed or varying shape. For example, patches could be defined as fixed-shape 5×5 or 7×7 rectangles. In some implementations, every patch in all of the images 140 has one of the mappings 200 to another patch which is located either on the same image or on another one of the images. In other implementations, the mappings 200 are sparser than one per patch. For clarity, only a few of the mappings 200 are illustrated here.

The methods and techniques described herein can be used, for example, to provide one or more nearest neighbors for a patch within an image collection, and/or to use a resulting image web for one or more purposes. Some implementations are enhanced using acceleration techniques, such as an "enrichment" search strategy and/or a parallel algorithm for multi-core architectures.

The image web 110 is generated by determining correspondence between a source image and a target image. The source and target images can be the same image or two separate images. That is, any of the images 140 (e.g., $I_k$) can be considered the source image and any other of the images 140 can be considered the target image.

In some implementations, one can search over a space of offsets into the target image. For example, a notation can be used such that a patch P in the source image (S) is defined as P=S(i,j), namely the patch in the image S having its upper left corner at column i and row j of the pixels in the image S. A patch T(k,l) in the target image (T) can be similarly defined.

The correspondence can be quantified using a patch distance function that is applied to pairs of patches in the source and target images. Any distance function can be used. Some implementations can use common distance functions for natural images and/or other data sources including video and three-dimensional shapes, such as an $L_p$, $L_1$, or clamped $L_2$, etc., or any other scalar function. If the patch distance function were applied for a given patch to all other patches among the images 140 (i.e., all possible pairings were evaluated, which can be considered a "brute force" approach), it could be determined for which one(s) of the other patches the patch distance function has a minimum. That is, the patch(es) with least patch distance to the current patch could be identified. In other implementations, however, a more efficient approach is used where not all possible pairings are evaluated. In any event, once the nearest neighbour has been found the mapping can be specified in terms of an offset between the current patch and the nearest neighbour.

In some implementations, a bidirectional similarity measure can be used, for example one that finds good correspondences between image regions in both directions (e.g., from the patch S(i,j) to the patch T(k,l), and vice versa).

An offset between patches S(i,j) and T(k,l) can be defined as (k−i, l−j). For example, if the two images S and T were identical, the best mapping from S to T when translation without warping is performed can be expressed as $$\arg\min_{k,l}(D[S(i,j),T(k,l)])=(k-i,l-j)$$

for all (i,j) and (k,l), where D is the patch distance function being used.

Here, the offset file 130 (FIG. 1) stores an estimate of all nearest-neighbor offsets. The offsets can be termed a nearest-neighbor field $f$ such that.

$$f:R^2 \mapsto R^2.$$

The nearest-neighbor field $f$ can be improved using a randomized patch-matching algorithm that is performed for a predefined number of iterations or until convergence. Initial offsets for all patches are defined as a starting point, and in each iteration the algorithm seeks to improve every offset using at least two sets of candidates: propagation candidates and random-search candidates. The propagation candidates for offset $f(x, y)$ are the known offsets above or to the left:

$$f(x-1, y)+(1,0)$$

and $$f(x, y-1)+(0,1)$$

where the plus symbols denote vector addition. That is, they are the right spatial neighbor of the current patch-space neighbor of the left spatial neighbor, and the upper spatial neighbor of the current patch-space neighbor of the bottom spatial neighbor.

Generally, a propagation candidate that provides a smaller patch distance D should replace the current offset. On alternating iterations, propagation can instead be done in reverse scan order, such that offsets below and to the right are examined. For example, the propagation candidates can then be:

$$f(x+1,y)-(1,0)$$

and $$f(x,y+1)-(0,1)$$

where the minus symbols denote vector subtraction. As another example, the propagation step can be done twice per iteration so that the propagation is done in both directions (i.e., in scan order and reverse scan order) in each iteration.

The random search can be done both among patches in the same image, or patches in the other images, or both. The random search can help prevent the evaluation of propagation candidates from ending up in a local minimum. The random-search candidates are sampled from an exponential distribution relative to the current offset (e.g., offsets located at an exponentially decreasing distance from the current offset in a random direction). The current offset is replaced if the random-search candidate has a smaller patch distance.

For problems such as denoising, symmetry detection, and object and clone detection, to name just a few examples, one may wish to compute more than a single nearest neighbor for every (i,j) position. A patch matching algorithm can be created to collect k nearest neighbors for each patch.

Multiple candidates can be found in various ways. Some implementations use an algorithm designed to find a single nearest-neighbor for each patch, such as the function f in the above example. For example, the k best matches found by the single-neighbor algorithm can be retained. As another example, the single-neighbor algorithm can be run k times, with each run constrained so that offsets cannot be equal to any of the previously chosen offsets.

If multiple offset candidates are established for a patch in S, they can be registered in respective ones of multiple offset objects. For example, k offset objects can be used to store k offset candidates for each patch. In another implementation, a single multidimensional offset object can store all k candidates for each patch.

Figure 3A:
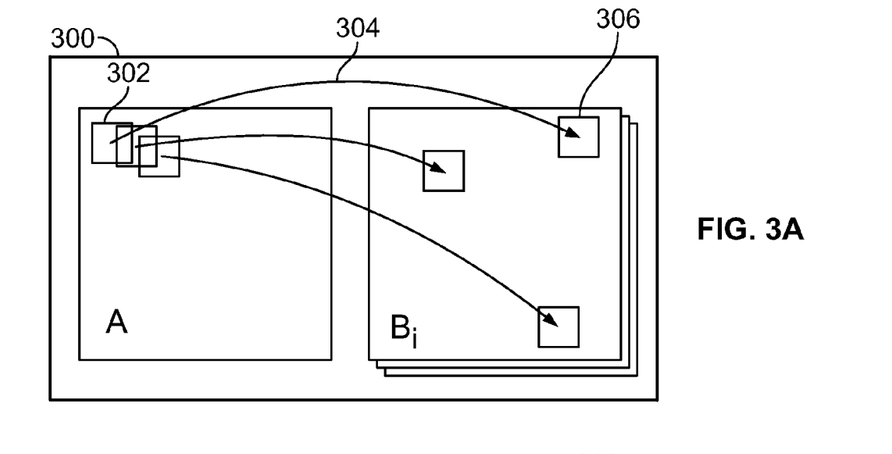
FIGS. 3A-C show another example of mapping between image regions in the image web of FIG. 1.

FIGS. 3A-C show another example of mapping between image regions in the image web of FIG. 1. In FIG. 3A, an image realm 300 includes an image A and a number of images B. A patch 302 is located in a region of the image A. The patch 302 is associated with one or more mappings 304 to another image region. The mappings 304 can be patch-to-patch mappings, similar to the ones described above.

In some situations, the mapping 304 represents an initial guess of what image region(s) best correspond to the patch 302, for example using the offsets mentioned above. For example, the other image region(s) can be located in an image $B_i$, such as the region(s) represented by one or more patches 306. The patch(es) 306 can include a rotated patch, a scaled patch, a non-rotated and non-scaled patch, or combinations thereof. A mapping can be improved in one or more iterations, for example as will now be described.

Figure 3B:
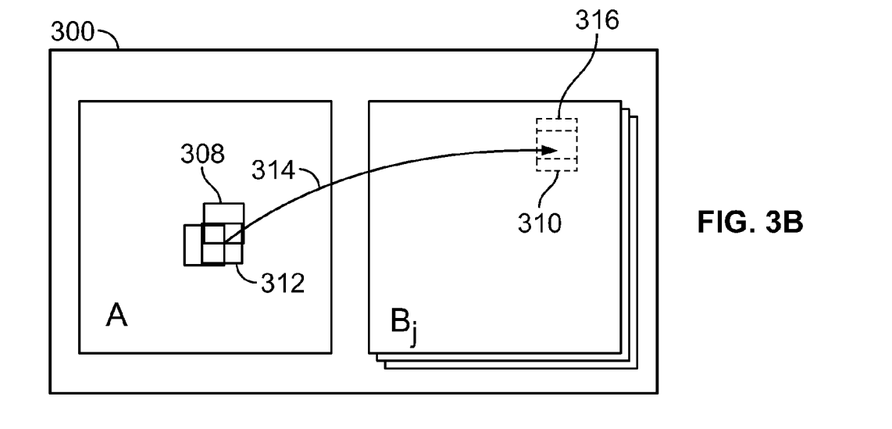

In some implementations, a propagation phase can be carried out as schematically illustrated in FIG. 3B. For example, assume that a patch 308 in the image A has been mapped to one or more patches 310 in a image $B_j$, which is another image than $B_i$ in the previous example. These mapping(s) between patches 308 and 310 not being shown in the figure for clarity. Neighbors of the patch 308 can now be evaluated to determine what mappings they have, and whether any of these mappings can be applied to the patch 308 for a better result. For example, the algorithm can look at the offsets of neighboring or nearby patches, and use one of these offsets if it provides a better result. In some implementations, an algorithm can look at the four immediately adjacent pixels, or all pixels in a circular or square neighborhood of diameter 2 or 4, and/or any subset of the pixels within a fixed distance of the pixel at which propagation occurs, to name just a few examples.

Here, for example, it may be determined that if one applies the mapping of a patch 312 to the patch 308, then the patch 308 can be provided with a mapping 314 to a patch 316, which has a better correspondence to the patch 308 than the earlier mapping to the patch 310. The term propagation indicates that good mappings for one patch can be propagated to neighboring patches to improve their mappings. Thus, for example, if a local maximum of correspondence exists in mappings of a neighborhood around the patch 308, it can be detected in the propagation phase.

In implementations that identify k offsets as possible matches for a patch, these k offsets can all be taken into account in the propagation phase. In some implementations, the k offsets are ranked with regard to patch distance (e.g., as determined using any distance metric). For example, the offsets can be included in a max-heap. When a new candidate offset for an arbitrary patch (x,y) is identified in the propagation phase, it is compared to the "worst" offset in the max-heap (i.e., the one of the identified offsets having the greatest patch distance). If the candidate offset's patch distance is "better" than the worst offset (i.e., it has less patch distance), then the worst offset is removed from the max-heap and the candidate offset is added to the max-heap; else the candidate offset may be ignored.

Figure 3C:
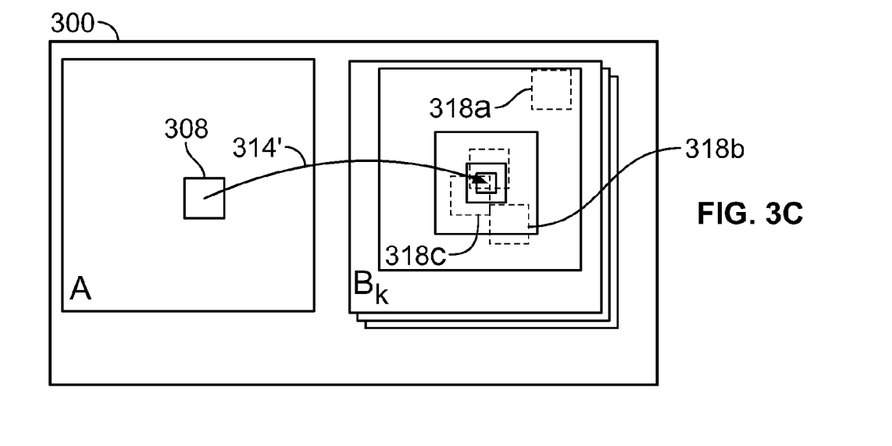

A perturbation such as a random-search phase can be used. The random search can be performed within one or more other images, for example as schematically illustrated in FIG. 3C, and/or within the same target image. First will be described an example of searching within a different image shown in FIG. 3C. Assume that the image $B_j$ is the current target image. Another one of the images, $B_k$, can then be randomly selected and one or more of its patches can be evaluated. Any suitable randomizing function can be used.

Here, a mapping 314' from the patch 308 to the image $B_k$ defines a starting point for the random search. For example, the patch in $B_k$ corresponding to the mapping 314' may have been randomly selected within the randomly chosen image $B_k$, or it may be an already existing mapping (e.g., when multiple candidate target patches are identified for the same source patch in each iteration). Other ways of obtaining or choosing the initial mapping within the randomly chosen image can be used, including, but not limited to, using a default patch (e.g., the patch in the center of the image).

Based on the mapping 314', one or more randomly selected mappings can then be evaluated. For example, patches 318A, 318B and 318C can be randomly selected in the image $B_k$. In some implementations, the patches 318A-C are selected to have gradually increasing or decreasing distance from the location of the original mapping target in the image $B_k$. For example, a random distribution can be used that includes nearby locations (e.g., the patch 218C) and locations further away (e.g., the patch 218A), wherein the distribution places more weight in the distribution function on distances of nearby locations than would be obtained from uniform sampling.

In some implementations, an algorithm can sample at uniform from the entire image with probability 1/2, and sample from a circle with small radius around the current mapping with probability 1/2, giving a random distribution where smaller distances are preferentially selected, and/or sample according to a Gaussian distribution around the current mapping, to preferentially select smaller distances. As another example, the probability density function can be generally decreasing, meaning that it does not have to be monotonic, but generally decreases as radius increases. In some implementations, the random search can be performed by sampling only those points whose distance is within an exponentially decreasing threshold from the mapping of the first patch. The patches 318A-C can be evaluated to determine whether a better correspondence with the patch 308 can be achieved using a randomly selected patch. If any of the randomly selected mappings has a smaller patch distance than the current mapping, the current mapping can be replaced with a mapping to the new patch.

In some implementations, multiple other images are chosen at random and a similar processing as just described is performed on one or more patches in each of those other images. The current mapping can be replaced with a different mapping each time a patch with shorter patch distance is found.

Second, an example of randomly searching within the same target image will now be described. Referring again to FIG. 3C, assume now instead that k=j, such that $B_k$ is the same image as $B_j$. Assume further that the mapping 314' is instead the mapping for the patch 308 that has been identified in a propagation step, for example as described above. Based on this existing mapping 314', one or more randomly selected mappings can then be evaluated, in analogy with the above example regarding searching in a different image. For example, patches 318A, 318B and 318C can be randomly selected within the same image as the current mapping for the patch 308, and these mappings 318A-C can be evaluated as to whether any of their patches would have a smaller patch distance for the patch 308 than its current mapping. If so, the current mapping can be replaced with a mapping to the new patch.

Figure 4:
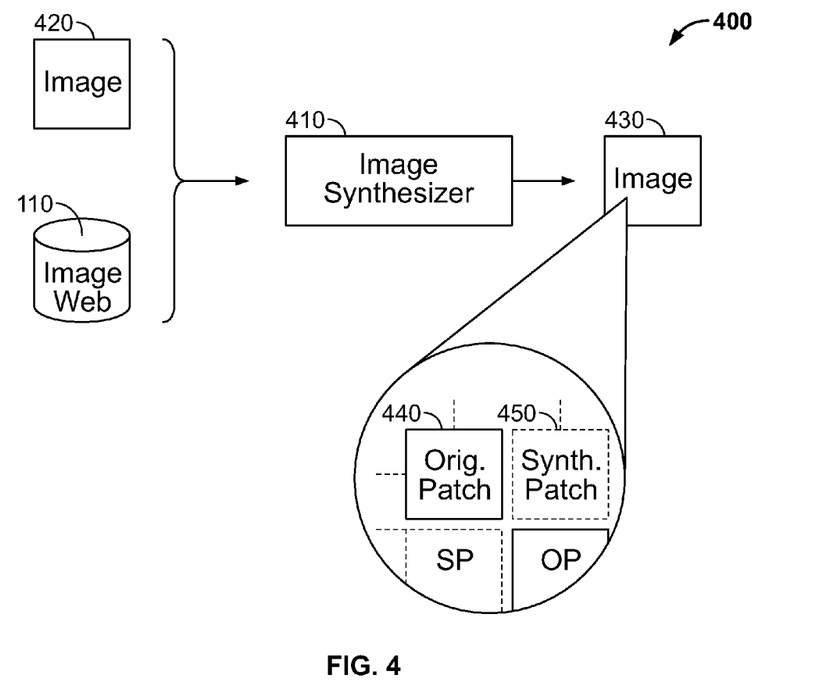
FIG. 4 schematically shows an example of a system that performs synthesis using the image web of FIG. 1.

FIG. 4 schematically shows an example of a system 400 that performs synthesis using the image web 110 of FIG. 1. Particularly, the system 400 includes an image synthesizer 410 that here operates on the image web 110 and at least one arbitrary image 420.

The image synthesizer 410 takes the image 420 as an input and generates one or more images 430 as a result. In some implementations, the image 430 is generated so that it has some image content from the image 420 and some other content that has been synthesized based on the image 420, using the image web 110. One or more original patches (labeled OP) 440 can be obtained from the image 420, and using the original patch(es) 440 one or more synthetic patches (labeled SP) 450 can be generated. For example, the image synthesizer 410 takes the original patch(es) 440 and makes comparison(s) against the image web 110, and then generates one or more of the synthetic patches 450 as a result.

A particular example of image synthesis is hole filling. That is, the image 420 may have a hole in it, meaning that at one or more locations in the image information corresponding to at least one pixel is missing from an otherwise regular pixel pattern. The hole may exist for any of multiple reasons, such as that a camera, scanner, memory or image transferring equipment malfunctions; that a person marks unwanted pixels in an image; or that a person assembles the image from smaller image fragments leaving some regions incomplete.

In such implementations, the image synthesizer 410 takes patches that are elsewhere in the image 420, compares them with the image web 110, and thereby obtains one or more similar patches that can be used to fill the hole.

Creation of an image collage is another example where one or more patches of image content are added to existing content. In some implementations, the image 420 can be created by a user who places one or more image contents (e.g., patches) on a larger canvas. For example, the user can cut and paste a rough collage of image fragments and then let the image synthesizer 410 can fill the gaps between the image fragments using matching parts from the many patches in the image web 110. Depending on the implementation, the image synthesizer 410 can generate a plausible image around the image fragments.

In some examples the collage is created without modifying the original image fragments. In other examples, the image synthesizer 410 is allowed to resynthesize the entire canvas, and therefore uses the original image fragments as a rough guide, or constraints, in generating the image 430.

Super resolution of an image, and retargeting an image to a greater size, are other examples where one or more patches of image content are added to existing content. Here as well, one challenge is that information must be assumed, to interpolate between known pixels. For example, the image 420 has a particular resolution (e.g., 200×200 pixels) and should now be given a higher resolution (e.g., 250×250). If this is done to the entire image, the synthetic patches 450 should equal a total of 22,500 new pixels. First, the original patches 440 can be formed by dividing the image 420 into suitably sized areas, each area forming one of the patches. Second, each of the new pixels for the synthetic patches 450 can be obtained from the image web 110 based on one or more of the original patches 440. Finally, the patches 440 and 450 can be assembled into the image 430 in a suitable way (e.g., by interspersing new pixels).

Figure 5:
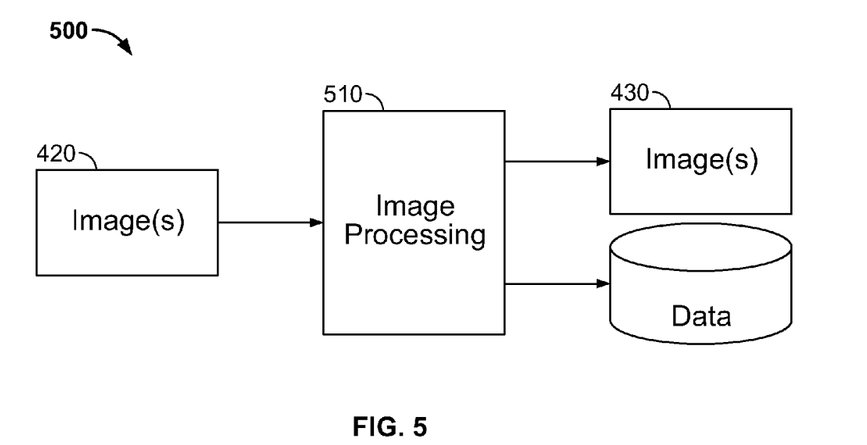
FIG. 5 is an example block diagram of a system that performs image processing.

FIG. 5 is an example block diagram of a system 500 that performs image processing. In the system 500, an image processing component 510 can perform one or more types of processing on the image 420. In some implementations, the image processing component 510 can perform image synthesis that results in the image 430, and the image processing component may then be similar or identical to the image synthesizer 410 (FIG. 4). In some implementations, however, the image processing component 510 can also or instead perform other useful processing.

A first example is that the image processing component 510 can be used in generating one or more image webs, for example the image web 110 described in examples above. In general terms, the generation of image webs can be said to fall into one of three categories:

A. Adding a single image to an N-web, forming an (N+1)-web

B. Combining an M-web with an N-web, forming an (M+N)-web

C. Starting with N images and forming an N-web

For example, in category C one can start by generating random mappings between all patches in the N images and then improve the mappings by iterative processes that will be exemplified below. As another example, an N-web can be iteratively constructed in category A, starting by expanding a 2-web to a 3-web, and so on. In category B, individual elements from the M-web can be added to the N-web, while retaining the best patch distances from the M-web where applicable, to name just one example.

Basically, in implementations where only one nearest neighbor should be registered for each patch, the image web can be represented as a multi-channel image where each location (i,j) contains the following:

R, G, B, x, y, n, d

Here, R, G and B are the respective RGB values for the pixel in the source image; x and y are the coordinates of the nearest neighbor that has been found for that source pixel (that is, the patch at (i,j) is mapped to the patch at (x,y)); n is the number of the image having the nearest neighbor; and d reflects the patch distance between the source patch and its nearest neighbor. For example, using the $L_2$ norm the patch distance could be equal to the square root of d. In some implementations, 12 bits are used for each of x and y, 16 bits for the image number n, and 24 bits are used for the patch distance (i.e., for d), which gives a total of 64 bits in addition to the RGB information.

Because of coherency in two or more images, some of the mappings may be redundant. Basically, the number of mappings used can in principle be the lowest number at which the image web is a useful structure, taking into account various factors, such as storage space, processing time, and fidelity (i.e., that a sufficiently similar patch can be found). As an example, and without limitation, in some situations it may be the case that an image web of 50 images requires the image web to be dense, or in other words to have one mapping for each patch. However, in a larger image web (e.g., having one million images) it may be sufficient to have only a subset or fraction of all possible mappings (e.g., 1% of the mappings). That is, an image web can have a specific sparsity in how many mappings are defined for the number of patches that the images contain.

In some implementations, mappings are stored sparsely, with fewer than one mapping per pixel. As a first example, the image web 110 (FIG. 1) can be computed and then made sparse for later storage and computation. As a second example, dense mappings can be computed for the working set and then made sparse only when writing to disk. As a third example, the algorithm that generates the image web 110 can be adapted so that it considers multiple patches at a time, and optimizes both sparse offsets and the regions that share those offsets in the inner loop.

A second example is that the image processing component 510 can be used in compressing one or more images. In some implementations, each image is stored not as compressed image information, but rather as a collection of mappings or other links to a suitable image web. When the image should be displayed, edited or otherwise accessed, it is first resynthesized from the image web using the mappings.

Figure 6:
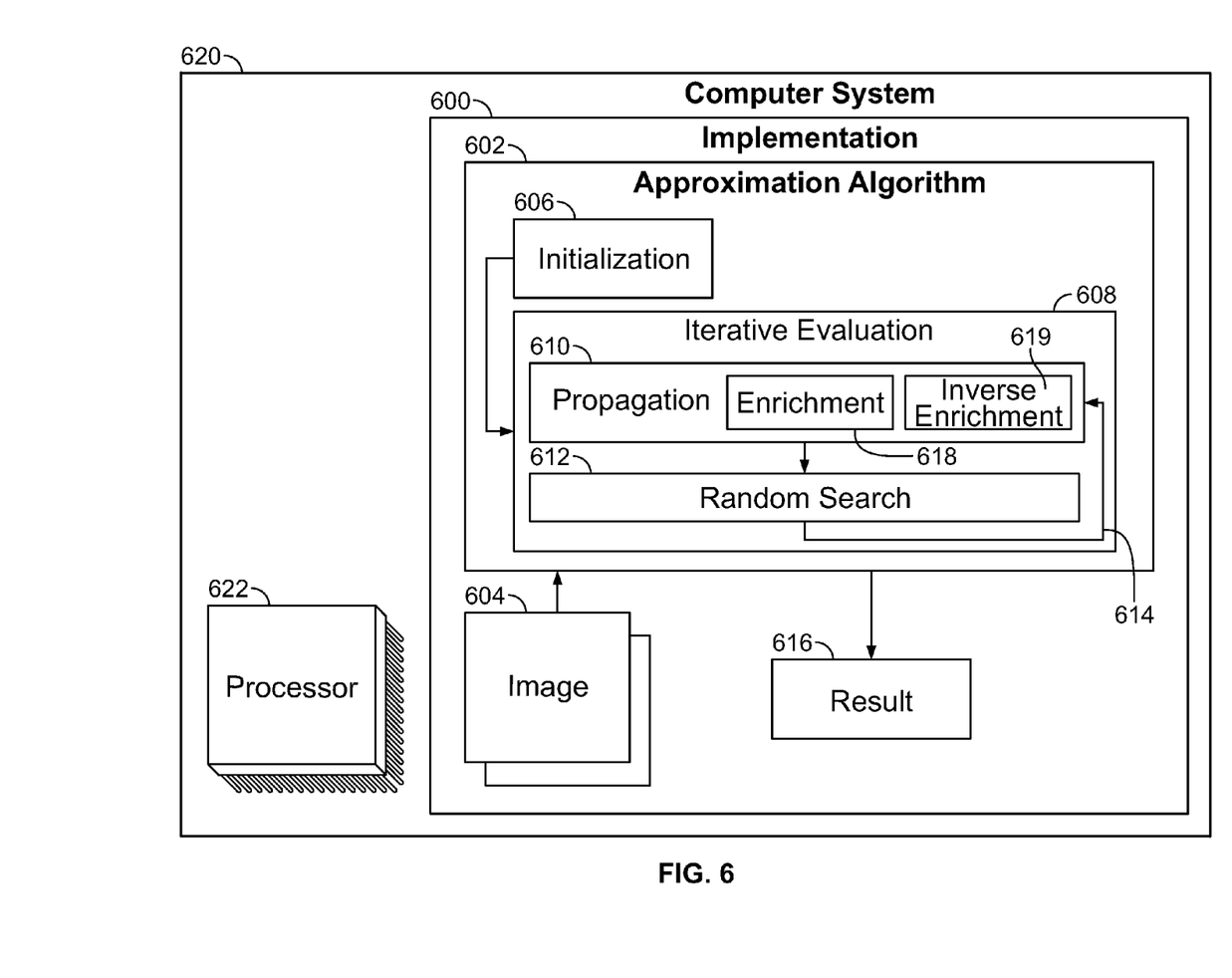
FIG. 6 shows an example implementation wherein iterations of propagation, randomized search and enrichment are performed.

FIG. 6 shows an example implementation 600 wherein iterations of propagation, randomized search and enrichment are performed. Here, the implementation 600 includes a randomized approximation algorithm 602. The randomized approximation algorithm 602 can identify, obtain and/or receive images 604 that are to be processed by the algorithm. In some examples, the implementation 600 is configured to determine bi-directional similarity in a synthesis algorithm and find correspondence between image regions, and the target image(s) may be somewhat similar to the source image.

The implementation 600 can include an initialization stage 606 that is performed to define the initial offsets or mappings for patches and/or pixels in at least one of the images 604. In some implementations, offset objects can be initialized with random offsets in the domains of the target and source images, respectively. For example, when one offset is identified per patch (i.e., k=1), the chance of any one pixel being assigned the best offset in such an approach can be (1/n), where n is the number of pixels in the image. However, the likelihood that at least one pixel in the image is assigned the best offset can be $(1-(1-1/n)^n)$. Moreover, the chance that a pixel is assigned an offset close to the correct offset can be $(1-(1-m/n)^n)$, where m is the area of the "close" offset region, for example a circle with a suitable radius. For large images these probabilities can converge to $1-1/e$ and $1-\exp(-m)$, respectively. If the random initialization is used in an implementation where multiple offsets are identified for each patch, this increases the chance that the best offset is among the randomly chosen initial offsets.

Other ways of initializing the offset objects can be used in the initialization 606. In some implementations, seeding can be used. For example, a small number of patch offsets can be initialized using a full k-d tree search to seed the initial estimates with a few pixels guaranteed to be optimal. In some implementations, external and/or manual correspondence can be used. For example, in an image analogy implementation the user may provide labels that constrain the initial guesses to a specific region of the input. In some implementations, a rough initial search can be performed. For example, approximate nearest neighbors can be found using a smaller patch size, such as a single pixel, and/or a reduced-dimensionality patch, and/or a search with a relatively fast distance metric such as $L_2$.

The approximation algorithm 602 can include an iterative evaluation 608. In some implementations, each iteration of the iterative algorithm can involve scanning through each pixel in the source image in a scan order, and the iterative evaluation can be continued until a stopping criterion is reached. The iterative evaluation 608 can include a propagation phase 610 and a phase for perturbing a result of the propagation phase 610, such as a random search phase 612.

In the propagation phase 610, the algorithm can loop through each pixel in an offset object, attempting to lessen the patch distance between the current patch and the matching patch(es). In implementations that search also among rotations and/or scales of the patches, the patch distance can be expressed as $$D[S(i,j), T(W_S(k,l) \cdot (i,j))]$$

where $W_S$ is a warping matrix being multiplied with the target patch location (i,j) to perform a warping action on the target patch. Then, the propagation phase seeks to determine whether the warping applied to another candidate patch (e.g., in a neighborhood) gives a better result than the current warping.

For example, one can define $$(u,v) \leftarrow \arg\min_{(k,l) \in N(i,j)} D[S(i,j), T(W_S(k,l) \cdot (i,j))]$$

$$W_S(i,j) \leftarrow W_S(u,v)$$

where N is a neighborhood of a particular offset pixel and $W_S(k,l) \cdot (i,j)$ represents the result of applying the warping action of patch (k,l) to the patch (i,j). That is, the propagation phase 610 applies the warping action of other patches (i.e., $W_S(k,l)$) to the present candidate patch (i.e., (i,j)), and the best such warping action (i.e., $W_S(u,v)$) is assigned as the warping action. For simplicity, the warping is here represented as a multiplication (dot product) between the warping object and the candidate patch. It will be understood that some warpings, such as polar transformations, do not involve a multiplication of the candidate patch.

The neighborhood N can be defined in various ways. In some implementations, a fixed spatial neighborhood of the pixel can be searched. For example, the neighborhood can include only the 4 adjacent pixels in the same row or column, or the eight surrounding pixels in the adjacent rows and columns, or the 24 closest pixels in the adjacent two rows and columns on all sides, to name a few examples.

A perturbation phase can be introduced, such as the random search phase 612 that uses random perturbations. For example, this can seek to overcome one or more local minima and to obtain convergence to a global optimum in the limit. In some implementations, the random search phase 612 can test a random set of alternate patches in the same or a different target image for each offset pixel. In some implementations, the random set can have an arbitrary distribution. In some implementations, however, the random set can be obtained according to a pattern, such as at an exponentially or otherwise decreasing distance from the currently guessed offset:

$$\text{cand}(i,j,t) \leftarrow W_S(i,j) + \omega \alpha^{-t}(a,b)$$

$$W_S(i,j) \leftarrow \arg\min_{(k,l) \in \text{cand}(i,j,t)} D[S(i,j), T(k,l)]$$

in which ω can be a fixed large distance (such as the image width), α can be a fixed ratio between search window sizes, and a and b are random variables in a domain, for example [−0.5, 0.5]. In some implementations, ω can be the larger of image height and width, and α=2. The above assignments to the cand variable can be repeated starting with t=0 and incrementing t until $\omega\alpha^{-t}$ is 1 or less. For example, this can allow the approximation algorithm 602 to jump relatively quickly to distant patch location and then sample more locally in that region.

Thus, the propagation phase 610 can serve to select the best mapping for a given patch/pixel based on what mappings are implied by the neighboring offset pixels. The random search phase 612, in turn, can serve to perturb that mapping selected in the propagation phase 610, for example by randomizations of geometrically decreasing size, and then select the best of the random offsets. Accordingly, the iterative evaluation can include an inner loop 614 that runs over each pixel and the propagation phase 610 and the random search phase 612 can be performed in the inner loop 614 over each pixel.

Accordingly, the sampling pattern in a random-search step can change locally (instead of a fixed pattern) to adapt locally to some properties of the patch. Examples of patch properties include: the distance at the previous patch-matching iteration, the local structure of the patch (e.g, each patch can be classified as one of several structures, such as a blob, a horizontal edge, a vertical edge, a uniform region, by convolving with some filters), and the local color of the patch and other local properties.

In some implementations, enrichment of a "forward" type or of an "inverse" type can be used. In the following examples about enrichment, a multi-valued function $f$ indicates a mapping from a patch position in an image to the patch positions of each of its k nearest neighbors. Enrichment can seek to propagate good matches across the space of patches themselves, as opposed to propagation across the spatial dimensions of the image. For example, an image A is sometimes matched to itself, such as in non-local-means denoising. In such implementations, patch matching can be performed for regions in a single image, as opposed to in separate images.

In forward enrichment, the function $f$ is composited with itself one or more times. As an example, the function $f^2$ can be created by considering all k nearest neighbors of each of the k nearest neighbors for the patch, which gives $k^2$ nearest neighbors of the nearest neighbors. As a nearest neighbor is a candidate patch, the nearest neighbors of the nearest neighbors can be considered candidate patches of the candidate patches, or candidate-candidate patches. From among the k nearest neighbors for the patch and the $k^2$ nearest neighbors for those, the top k matches are taken. In some implementations, higher orders of the function can be used, such as $f^3, f^4$, and so forth. A variant of forward enrichment can then be used, for example by taking k random samples from the function $f^n$, or taking the top $n\sqrt{k}$ If elements of $f$.

In some implementations, an enrichment procedure 618 can be performed before a result is generated. In the enrichment procedure 618 it can be evaluated whether the neighbor of the current nearest neighbor is a better match than the current nearest neighbor itself. With reference again to FIG. 2, assume that at least the mappings 200A and 200C have been determined so far in the process. That is, the currently nearest neighbor for the patch 210A is the patent 210B, and the currently nearest neighbor for the patch 210B is the patch 210E. The evaluation can then compute the patch distance of the patch 210E with regard to the patch 210A. If this patch distance is less than the patch distance that the patch 210B has, then the patch 210E is the better match of the two for the patch 210A. Accordingly, the patch 210E can instead be made the current nearest neighbor for the patch 210A.

In inverse enrichment, candidates are produced by reversing pointers to nearest neighbors. As an example, the function $f^{-1}$ represents the multi-valued inverse of the function $f$. That is, for an arbitrary patch a, say in the image T (FIG. 1), the function $f^{-1}$ returns any patch(es) in the image S pointing to the patch a. If no patch in S points to the patch a, then the function $f^{-1}$ has no value for that patch. If the patch distance function is symmetric, such that the distance from patch a to patch b is the same as the distance from patch b to patch a, then patch distances need not be explicitly calculated for the function $f^1$. The function $f^{-1}$ can be stored using a list of varying length at each position. From among the k nearest neighbors for the patch and the neighbors from the function $f^{-1}$, the top k matches are taken. In some implementations, higher orders of the function can be used, such as $f^{-2}, f^{-3}$, and so forth. In some implementations, forward enrichment is followed by inverse enrichment, or vice versa. For example, $f^{-1}$ inverse enrichment can be followed by $f^2$ forward enrichment.

In some implementations, an inverse enrichment procedure 619 can be performed before a result is generated. In the inverse enrichment procedure 619 it can be evaluated whether a current patch is a better match for its nearest neighbor than the patch that the nearest neighbor currently is mapped to. Still referring to FIG. 2, the patch distance of patch 210A with regard to patch 210B is the same as the patch distance of patch 210B with regard to patch 210A. Because the latter distance has already been calculated, the inverse enrichment procedure 619 can simply read the value from the offset file or another location. Similarly, the patch distance of patch 210E with regard to patch 210B has also been calculated previously. By comparing these distances, the inverse enrichment procedure 619 can decide whether the patch 210B should be mapped to the patch 210A instead of as currently to the patch 210E.

The above examples illustrate how enrichment can be viewed as making different numbers of "hops" forwards or backwards the graph. That is, the example $f^2$ forward enrichment corresponds to one "forward" hop in the graph, because it goes from taking into account only the neighbors of a patch to taking into account also the neighbors of those neighbors. The example $f^{-1}$ inverse enrichment, in turn, corresponds to one "backward" hop in the graph, because it considers also all patches that point to a particular neighbor.

In some implementations, the number of hops in an enrichment phase can be handled in an analogous way. A fixed distribution, or an adaptively changing distribution, can be used. The distribution can be adapted using a local property, such as the previous patch distance (based on the notion that the closer one is to the true nearest neighbor, the fewer hops one should make).

The approximation algorithm 602 can be terminated using one or more stopping criteria. In some implementations, a stopping criterion can be defined by the application in the implementation 600. For example, a fixed number of iterations can be used or the iterations can be performed until the fraction of pixels changed in the offset object(s) is below a threshold. As an example, 5-10 iterations can be used in some implementations.

The approximation algorithm 602 can generate one or more results 616. For example, the result 616 can include an image in which one or more holes in the image 604 have been filled. As another example, the result 616 can indicate, for at least one patch in the image 604, a corresponding at least one patch in the same image or in another one of multiple images.

In some implementations, the result can reflect a bidirectional similarity between the images 604.

Varying numbers of candidates can be identified for one or more patches. In some implementations, fewer than all k offsets are taken into account in the propagation 610. For example, only the offset with the smallest distance is subjected to propagation. As another example, one or more elements among the k offsets can be randomly chosen for propagation. Similarly, the random search 612 can be performed only for the offset(s) having smallest patch distances, or for one or more randomly chosen offsets. Some implementations perform propagation and/or random search on the m best offsets (with the number m randomly chosen from 1 to k.)

The number k can be changed during iterations. In some implementations, iteration number one can start with $k_0$ number of nearest neighbors, and after a portion of the iterations are completed (e.g., half of them), the number can be increased or decreased to k, the final desired number of nearest neighbors. For example, the worst elements of the heap can be dropped, or uniform random elements can be added. In some implementations, $k_0=k/2$ or $k_0=2k$ can be used.

Computer processing can involve more than one processor core. An implementation can be practiced in a computer system that has a multi-core architecture. For example, the computer system 620 can have a processor 622 that is a multi-core processor, such as an eight-core processor. As another example, the computer system 620 can have multiple single-core processors.

Processing in the system 600 can be performed on multiple computers. In some implementations, the image web 110 (FIG. 1) can be distributed across a network of computers that perform various parts of the processing. It can then be useful to divide the images into working sets. For example, the working sets can be chosen based on locality in the network.

Figure 7:
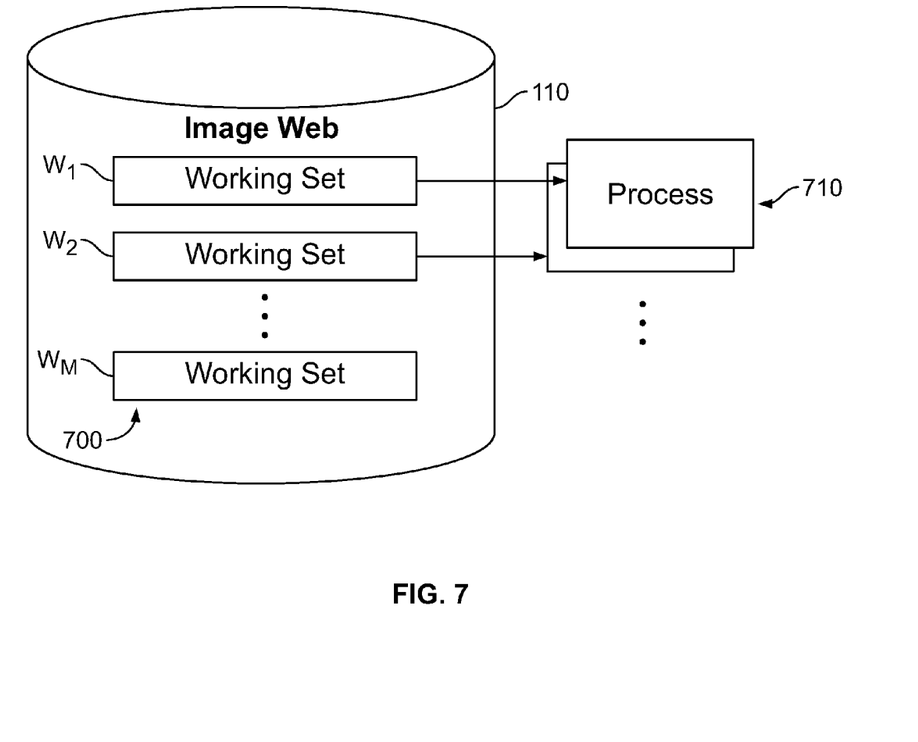
FIG. 7 schematically shows working sets for the image web of FIG. 1.

FIG. 7 schematically shows working sets 700 for the image web 110 of FIG. 1. In this example, M number of working sets 700 are being used, which are here labeled $W_1, W_2, \ldots, W_M$, respectively.

For example, the working sets 700 can serve to distribute various aspects of the processing performed in propagation, random search, and/or enrichment phases over more than one core. That is, the images that are to be processed can be assigned to respective ones of the working sets 700. Each of the working sets 700 can then be processed by one of multiple processes 710.

In some implementations, images are assigned to working sets as follows. Each working set should be sized so that it fits in memory available to the corresponding process 710. To choose the proper number of images, they are selected as three different subgroups. A first subgroup, here called w1, is made up of images selected by choosing random locations in a current image, determining what image(s) these locations map to, and selecting those target images for w1.

A second subgroup w2 is made up of images selected by choosing random locations in a current image, determining what patch(es) these locations map to, and selecting target images for w1 that contain the nearest neighbors for the patched mapped to by the randomly selected locations.

A third subgroup w3 is made up of images selected randomly.

Thus, the entire working set is:

$$w=w1+w2+w3$$

If parallel or cluster processing is performed, the image in the working set that is being modified by one of the processors can be locked. If a processor that is creating a working set attempts to take an image that is locked, the processor can simply choose another image in the same fashion (i.e., according to subset w1, w2 or w3). In some implementations the working set is divided into readable sets, which may overlap between processors, and writeable sets, which are locked per-core. For example, even if a first processor is reading an image to which a second processor is writing but has not yet committed to the data store, the first processor can use the previously computed offsets in the image to find nearest neighbors.

The sweep over an image can proceed in the order of: propagation, random search, inverse enrichment, enrichment. However, for all operations, the current processor can only read or update those of the images that are in the current working set.

The image that is currently to be worked on can be chosen at random from the respective working set. In some implementations, the selection takes into account which images have already been worked on the most. That is, images that have been worked on a few times less than the most worked on images can be selected with a probability near one. This way, the algorithm tends to localize images of a particular type that it works on, as things similar to the current working set are continually being provided in form of the subsets w1 and w2. One cluster may tend to do images depicting grass, as an example. As new images are brought into the working set, if they haven't been worked on previously in another process, they are chosen to be worked on in the current process with high probability.

Images can be ejected from a working set. In some implementations, a subgroup w4 is randomly chosen from the working set (i.e., from w), the subgroup w4 is ejected, and the subgroup w4 is replaced with other images. For example, the other images can be selected based on the respective subgroup of the ejected images.

Another form of eviction is "least used" eviction. In some implementations, this is done based on a counter that is maintained for each image. For example, the counter shows how many times the offsets of this image have been improved, and/or how many times the offsets have been used in improving the mapping in another image. The least used images can then be evicted, and the counters be reset for the new images.

Some portions of the detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for determining correspondence between images, the method comprising:
   receiving images in a computer system;
   performing iterations using the computer system to find respective mappings for each patch of pixels in the images to a patch in another one of the images such that the mappings have minimal patch distance, the iterations including at least: (i) evaluation of a nearby-pixel mapping in a current image, (ii) evaluation of a randomly selected mapping in the current image, and (iii) evaluation of a randomly selected mapping in another one of the images; and
   generating a mapping record that results from the iterations, the mapping record having a specific sparsity with less than one mapping per pixel.

2. The computer-implemented method of claim 1, wherein a first patch is currently mapped to a second patch, and wherein the second patch is currently mapped to a third patch, the method further comprising determining whether the third patch has a smaller patch distance to the first patch than what the second patch has, and if so mapping the first patch to the third patch instead.

3. The computer-implemented method of claim 1, wherein a first patch is currently mapped to a second patch, and wherein the second patch is currently mapped to a third patch, the method further comprising determining whether the first patch has a smaller patch distance to the second patch than what the third patch has, and if so mapping the second patch to the first patch instead.

4. The computer-implemented method of claim 1, further comprising assigning groups of the images to each of multiple working sets, and providing each of multiple processes with at least one of the working sets, wherein each process uses the group of images in the respective working set.

5. The computer-implemented method of claim 4, wherein assigning the group of images for at least one of the working sets comprises: finding a first subset of the group by choosing random locations in a first image and selecting the images to which the respective random locations are mapped; finding a second subset of the group by choosing random locations in the first image and selecting the images that are mapped to by locations to which the random locations are mapped; and finding a third subset of the group by choosing images at random.

6. The computer-implemented method of claim 5, further comprising ejecting at least some of the images from the working set and replacing them with a new group from the received images, each image in the new group selected based on which of the first, second and third subsets included a corresponding ejected image.

7. The computer-implemented method of claim 1, wherein the performing continues until a stopping criteria is met.

8. A computer program product embodied in a non-transitory storage device and comprising instructions that when executed by a processor perform a method comprising:
   receiving images in a computer system;
   performing iterations using the computer system to find respective mappings for each patch of pixels in the images to a patch in another one of the images such that the mappings have minimal patch distance, the iterations including at least: (i) evaluation of a nearby-pixel mapping in a current target image, and (ii) evaluation of a randomly selected mapping in another one of the images; and
   generating a mapping record that results from the iterations, the mapping record having a specific sparsity with less than one mapping per pixel.

9. The computer program product of claim 8, wherein a first patch is currently mapped to a second patch, and wherein the second patch is currently mapped to a third patch, the method further comprising determining whether the third patch has a smaller patch distance to the first patch than what the second patch has, and if so mapping the first patch to the third patch instead.

10. The computer program product of claim 8, wherein a first patch is currently mapped to a second patch, and wherein the second patch is currently mapped to a third patch, the method further comprising determining whether the first patch has a smaller patch distance to the second patch than what the third patch has, and if so mapping the second patch to the first patch instead.

11. The computer program product of claim 8, the method further comprising assigning groups of the images to each of multiple working sets, and providing each of multiple processes with at least one of the working sets, wherein each process uses the group of images in the respective working set.

12. The computer program product of claim 11, wherein assigning the group of images for at least one of the working sets comprises: finding a first subset of the group by choosing random locations in a first image and selecting the images to which the respective random locations are mapped; finding a second subset of the group by choosing random locations in the first image and selecting the images that are mapped to by locations to which the random locations are mapped; and finding a third subset of the group by choosing images at random.

13. The computer program product of claim 12, the method further comprising ejecting at least some of the images from the working set and replacing them with a new group from the received images, each image in the new group selected based on which of the first, second and third subsets included a corresponding ejected image.

14. The computer program product of claim 8, the method further comprising storing the generated mapping record.

15. The computer program product of claim 8, the method further comprising resynthesizing one of the received images based, at least in part, on the generated mapping record.

16. A system comprising:

a repository of images; and an image processing component that performs iterations to find respective mappings for each patch of pixels in the images to a patch in another one of the images such that the mappings have minimal patch distance, the iterations including at least: (i) evaluation of a nearby-pixel mapping in a current image, (ii) evaluation of a randomly selected mapping in the current image, and (iii) evaluation of a randomly selected mapping in another one of the images; and generates a mapping record based on the iterations, the mapping record having a specific sparsity with less than one mapping per pixel.

17. The system of claim 16, wherein a first patch is currently mapped to a second patch, and wherein the second patch is currently mapped to a third patch, and wherein the image processing component further determines whether the third patch has a smaller patch distance to the first patch than what the second patch has, and if so maps the first patch to the third patch instead.

18. The system of claim 16, wherein a first patch is currently mapped to a second patch, and wherein the second patch is currently mapped to a third patch, and wherein the image processing component further determines whether the first patch has a smaller patch distance to the second patch than what the third patch has, and if so maps the second patch to the first patch instead.

19. The system of claim 16, wherein the image processing component further assigns groups of the images to each of multiple working sets, and provides each of multiple processes with at least one of the working sets, wherein each process uses the group of images in the respective working set.

20. The system of claim 19, wherein assigning the group of images for at least one of the working sets comprises: the image processing component finding a first subset of the group by choosing random locations in a first image and selecting the images to which the respective random locations are mapped; the image processing component finding a second subset of the group by choosing random locations in the first image and selecting the images that are mapped to by locations to which the random locations are mapped; and the image processing component finding a third subset of the group by choosing images at random.

21. The system of claim 19, wherein the image processing component further ejects at least some of the images from the working set and replaces them with a new group from the received images, each image in the new group selected based on which of the first, second and third subsets included a corresponding ejected image.

* * * * *